United States Patent
Horita

(10) Patent No.: US 11,130,452 B2
(45) Date of Patent: Sep. 28, 2021

(54) AUTOMOBILE INTERIOR COMPONENT

(71) Applicant: KASAI KOGYO CO., LTD., Kanagawa (JP)

(72) Inventor: Akiyoshi Horita, Atsugi (JP)

(73) Assignee: KASAI KOGYO CO, LTD., Kanagawa (JP)

(*) Notice: Subject to any disclaimer, the term of this patent is extended or adjusted under 35 U.S.C. 154(b) by 100 days.

(21) Appl. No.: 16/623,654

(22) PCT Filed: Dec. 6, 2017

(86) PCT No.: PCT/JP2017/043777
§ 371 (c)(1),
(2) Date: Dec. 17, 2019

(87) PCT Pub. No.: WO2019/111345
PCT Pub. Date: Jun. 13, 2019

(65) Prior Publication Data
US 2020/0198553 A1 Jun. 25, 2020

(51) Int. Cl.
*B60R 13/02* (2006.01)

(52) U.S. Cl.
CPC ...... *B60R 13/0243* (2013.01); *B60R 13/0206* (2013.01)

(58) Field of Classification Search
CPC .................. B60R 13/0243; B60R 13/0206
See application file for complete search history.

(56) References Cited

U.S. PATENT DOCUMENTS 7,658,426 B2 * 2/2010 Hayakawa .......... B29C 44/1257
296/39.1
2004/0104542 A1 6/2004 Kobayashi et al.

FOREIGN PATENT DOCUMENTS

| JP | H08-091050 A | 4/1996 |
| JP | 2001-010338 A | 1/2001 |
| JP | 2004-098768 A | 4/2004 |
| JP | 2009-029297 A | 2/2009 |

OTHER PUBLICATIONS

International Search Report for International Application No. PCT/JP2017/043777 dated Mar. 6, 2018, Japan, 1 page.

* cited by examiner

*Primary Examiner* — D Glenn Dayoan
*Assistant Examiner* — Melissa Ann Bonifazi
(74) *Attorney, Agent, or Firm* — United IP Counselors, LLC

(57) ABSTRACT

A projecting part is provided at the tip of a flange. With a trim body being tilted down on one of the vehicle front and rear sides, by a portion around one end of the flange being firstly inserted into a groove provided on the vehicle body panel side, the flange and the groove as a whole function as means for determining an initial mount position of the trim body relative to the vehicle body panel. The projecting part is positioned around the one end of the flange firstly inserted into the groove and enters inside the groove preceding the portion around the one end of the flange when an insert position misalignment of the flange relative to the groove occurs. Thus, the projecting part functions as means for correcting the insert position misalignment of the flange.

2 Claims, 6 Drawing Sheets

AUTOMOBILE INTERIOR COMPONENT

CROSS-REFERENCE TO RELATED APPLICATIONS

This application is a National Stage Entry application of PCT International Application No. PCT/JP2017/043777, filed on Dec. 6, 2017, the entire contents of which are hereby incorporated by reference.

BACKGROUND

1. Technical Field

The present invention relates to an automotive interior component configured to be mounted on the inner surface of a vehicle body panel (for example, a door trim), and particularly to an automotive interior component which suitably improves mount workability.

2. Description of the Background

A conventionally known automotive interior component of this type is, for example, a door trim configured to be mounted on the inner surface of a vehicle body panel (for example, see the trim board T in Japanese Unexamined Patent Application No. 2004-98768, hereinafter referred to as Patent Literature 1).

FIG. 5 is a schematic perspective view of a conventional automotive interior component (a door trim) and a conventional vehicle body panel. FIG. 6 is a view on arrow B in FIG. 5 (where the portion around one end of a flange is stuck at the edge of the groove).

With reference to FIG. 5, a door trim 1 which is an automotive interior component (hereinafter referred to as "the conventional door trim 1") includes a trim body 2 formed of resin to have a predetermined shape, trim mount-fixing means 3 for mounting and fixing the trim body 2 onto a vehicle body panel P (specifically, a door inner panel) and implemented by known clips or the like, and a flange 4 folded back downward from an upper edge 2A of the trim body 2.

In mounting the conventional door trim 1 on the vehicle body panel P, firstly, the back surface of the trim body 2 and the inner surface of the vehicle body panel P are opposed to each other, with the whole trim body 2 being tilted down on one of the vehicle front and rear sides as indicated by the phantom line in FIG. 5. In this state, the first flange inserting work is performed. The first flange inserting work is, as shown in FIG. 6, firstly inserting the portion around one end 4A of the flange 4 into a groove 63 provided on the vehicle body panel P side in FIG. 5.

When the above-described first flange inserting work is completed, next, the final flange inserting work is performed. The final flange inserting work specifically includes: (1) rotating the whole trim body 2 about the portion around the one end 4A of the flange 4 inserted into the groove 63 in the first flange inserting work, so as to correct the tilted attitude of the trim body 2; (2) in the final stage of this attitude correction work, inserting the whole tip of the flange 4 following the portion around one end 4A into the groove 63, so as to set the whole tip of the flange 4 to be inserted into the groove 63.

Then, when the above-described final flange inserting work is completed, finally, the surface of the trim body 2 is pressed against the vehicle body panel P, to mount and fix the trim body 2 onto the vehicle body panel P with the trim mount-fixing means 3. This completes the work of mounting the door trim 1 on the vehicle body panel P.

However, in the mounting work with the conventional door trim 1, particularly in the first flange inserting work, the insert position of the flange may be misaligned. In this case, as shown in FIG. 6, the portion around the one end 4A of the flange 4 may be stuck at the edge of the groove 63. In this case, since the portion around the one end 4A of the flange 4 is hidden from the operator, it is troublesome to correct the insert position misalignment of the flange. That is, the workability in mounting the conventional door trim 1 on the vehicle body panel P is poor.

BRIEF SUMMARY

The present invention provides an automotive interior component which suitably improves workability in mounting the automotive interior component on a vehicle body panel.

In order to achieve the object, the present invention provides an automotive interior component including: a trim body formed of resin to have a predetermined shape; trim mount-fixing means for mounting and fixing the trim body onto a vehicle body panel; a flange folded back downward from an upper edge of the trim body; and a projecting part provided at a tip of the flange. With the trim body being tilted down on one of the vehicle front and rear sides, by a portion around one end of the flange being firstly inserted into a groove provided on the vehicle body panel side, the flange and the groove as a whole function as means for determining an initial mount position of the trim body relative to the vehicle body panel. By the projecting part being positioned around the one end of the flange firstly inserted into the groove and entering inside the groove preceding the portion around the one end of the flange when an insert position misalignment of the flange relative to the groove occurs, the projecting part functions as means for correcting the insert position misalignment of the flange.

In the present invention, the projecting part may function as means for allowing an operator to ascertain a provision of a desired gap between the tip of the flange and a bottom of the groove by providing the operator with an abutting touch of a tip of the projection against the bottom of the groove.

In the present invention, as described above, the projecting part is provided at the tip of the flange. The projecting part is positioned around one end of the flange firstly inserted into the groove. When an insert position misalignment of the flange relative to the groove occurs, by virtue of the projecting part entering inside the groove preceding the portion around the one end of the flange, the projecting part functions as means for correcting the insert position misalignment of the flange. Accordingly, in the work of inserting firstly the portion around the one end of the flange into the groove with the whole trim body tilted down on one of the vehicle front and rear sides, that is, in the first flange inserting work, any insert position misalignment of the flange is corrected by the above-described function of the projecting part. This provides the operation and effect of the facilitated and trouble-free first flange inserting work and improved workability in mounting the automotive interior component on the inner surface of the vehicle body panel.

DETAILED DESCRIPTION

In the following, with reference to the drawings, a detailed description will be given of the best mode for carrying out the present invention.

Figure 1:
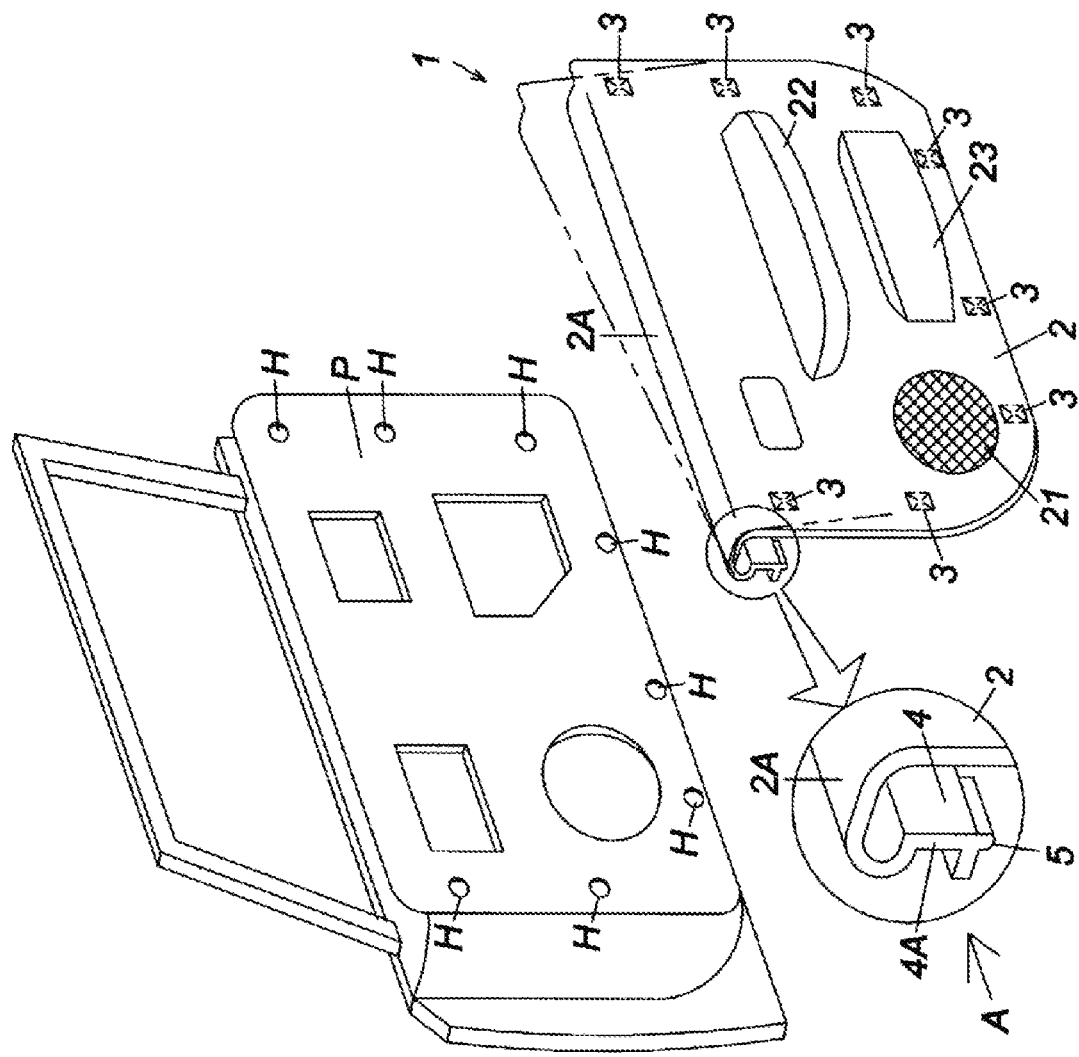
FIG. 1 is a schematic perspective view of a door trim (an automotive interior component) and a vehicle body panel to which the present invention is applied.

FIG. 1 is a schematic perspective view of a door trim (an automotive interior component) and a vehicle body panel to which the present invention is applied.

Figure 2:
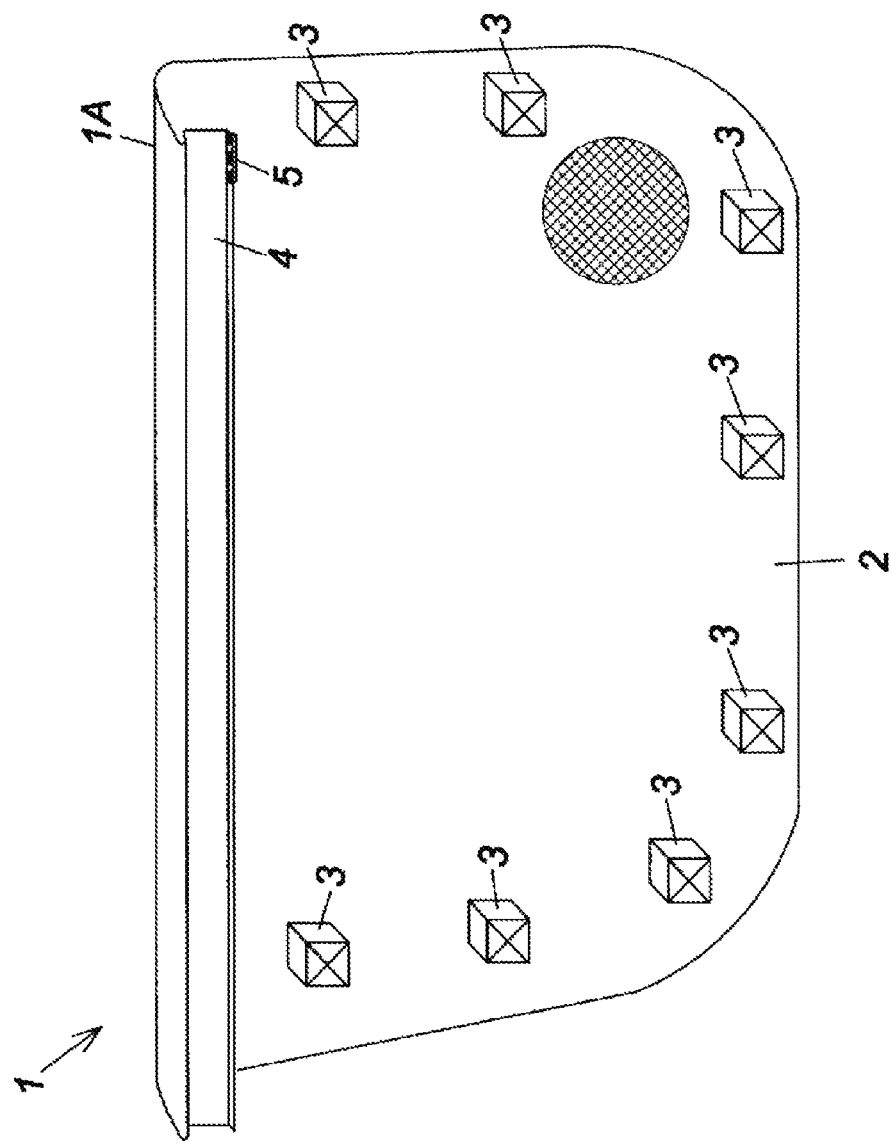
FIG. 2 is a schematic back surface view of the door trim in FIG. 1.
Figure 3:
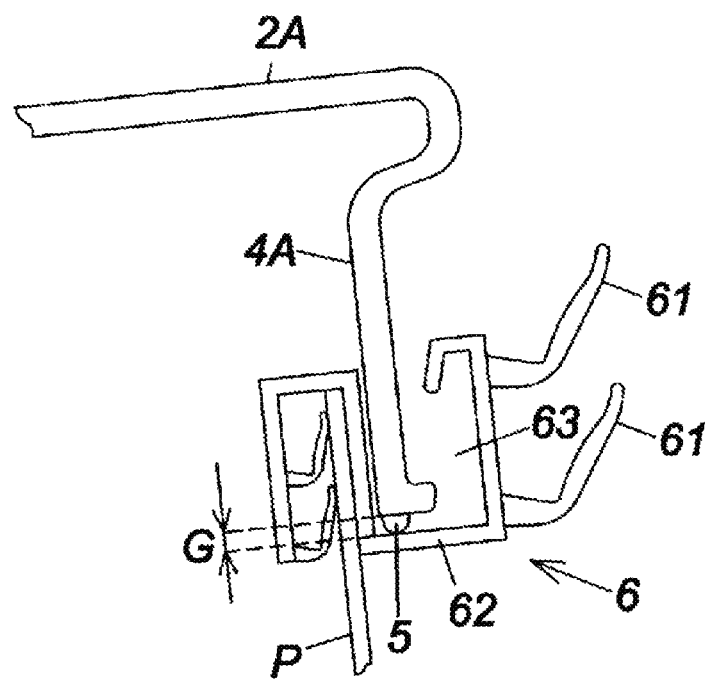
FIG. 3 is a view on arrow A in FIG. 1 (the state where the tip of the flange is inserted into a groove).

FIG. 2 is a schematic back surface view of the door trim shown in FIG. 1. FIG. 3 is a view on arrow A in FIG. 2 (the state where the tip of the flange is inserted into the groove).

Description of Configuration of Door Trim

With reference to FIG. 1, a door trim 1 which is an automotive interior component (hereinafter referred to as "the door trim 1 according to the present embodiment") in FIG. 1 includes: a trim body 2 formed of resin to have a predetermined shape; trim mount-fixing means 3 for mounting and fixing the trim body 2 onto a vehicle body panel P (specifically, a door inner panel); a flange 4 folded back downward from an upper edge 2A of the trim body 2; and a projecting part 5 provided at the tip of the flange 4.

While the trim body 2 is provided with various functional components such as a speaker grille 21, an armrest 22, a door pocket 23 and the like, these functional components are well known. Therefore, a detailed description thereof is not given. Also, the trim body 2 is well known to have the structure including a resin core member and a surface member bonded to the surface of the resin core member and, therefore, a detailed description thereof is not given.

The trim mount-fixing means 3 may be known mount clips. The mount clips of this type are provided at the back surface of the trim body 2 to be each inserted into a mount hole H provided on the vehicle body panel P side, so that the trim body 2 is mounted and fixed onto the vehicle body panel P. Note that, the number and arrangement position of the trim mount-fixing means 3 in FIG. 2 are shown for the sake of convenience in description, and may be changed as appropriate as necessary.

The flange 4 is integrally formed on the upper side of the door trim body 2, and formed as being folded from the front toward the back of the door trim body 2. Thus, the flange 4 is positioned on the back surface side of the door trim 2 as shown in FIG. 2.

The door trim 1 according to the present embodiment is configured so that, in the state where the trim body 2 is mounted on the vehicle body panel P, a known inner seal member 6 (see FIG. 3) is disposed between the vehicle body panel P and the trim body 2.

The inner seal member 6 includes elastic seal parts 61 formed of rubber members or the like, and a seal base part 62 which supports one ends of the elastic seal parts 61.

The elastic seal parts 61 are configured to abut on the inner surface of a not-shown door window glass, and pressed against the inner surface of the door window glass by the reactive force of the abutment.

The seal base part 62 is mounted and fixed onto the vehicle body panel P side, and includes a groove 63 which is capable of opposing to the above-described tip of the flange 4. This groove 63 is used as the groove into which the tip of the flange 4 of the trim body 2 is inserted in mounting the trim body 2 on the vehicle body panel P.

Description of Function of Flange and Groove

Meanwhile, in mounting the door trim 1 according to the present embodiment on the vehicle body panel P, as the first work, the operator has the back surface of the trim body 2 and the inner surface of the vehicle body panel P opposed to each other, and sets the attitude of the trim body 2 tilted down on one of the vehicle front and rear sides. In this state, by firstly inserting the portion around the one end 4A of the flange 4 into the groove 63 on the vehicle body panel P side, the flange 4 and the groove 63 as a whole function as means for determining the initial mount position of the trim body 2 relative to the vehicle body panel P.

Description of Function of Projecting Part (No. 1)

The projecting part 5 is positioned around the one end 4A of the flange 4 firstly inserted into the groove 63. The projecting part 5 enters the groove 63 preceding the portion around the one end 4A of the flange 4, when an insert position misalignment of the flange 4 relative to the groove 63 occurs. Thus, the projecting part 5 functions as means for correcting the insert position misalignment of the flange 4.

Description of Function of Projecting Part (No. 2)

The tip of the projecting part 5 abutting on the bottom of the groove 63 provides the operator with the abutting touch. Thus, the projecting part 5 functions as means for allowing the operator to ascertain that a desired gap G is provided between the tip of the flange 4 and the groove 63. The desired gap G functions to absorb any expansion or contraction of the door trim body 2 and the flange 4 due to variations in the operating temperature. Therefore, it is critical to ascertain the provision of the desired gap G by the abutting touch in carrying out the work of mounting the door trim 1.

Procedure of Mounting Door Trim According to Present Embodiment

The procedure of mounting the door trim 1 according to the present embodiment on the vehicle body panel P includes the following first to third procedures.

Procedure 1

In mounting the door trim 1 according to the present embodiment on the vehicle body panel P, firstly, the operator has the back surface of the trim body 2 and the inner surface of the vehicle body panel P opposed to each other, and sets the attitude of the trim body 2 so that the whole trim body 2 is tilted down on one of the vehicle front and rear sides as indicated by the phantom line in FIG. 1. In this state, the operator performs the first flange inserting work. The first flange inserting work is inserting firstly the portion around the one end of the flange 4 into the groove 63 on the vehicle body panel P side.

Figure 4A:
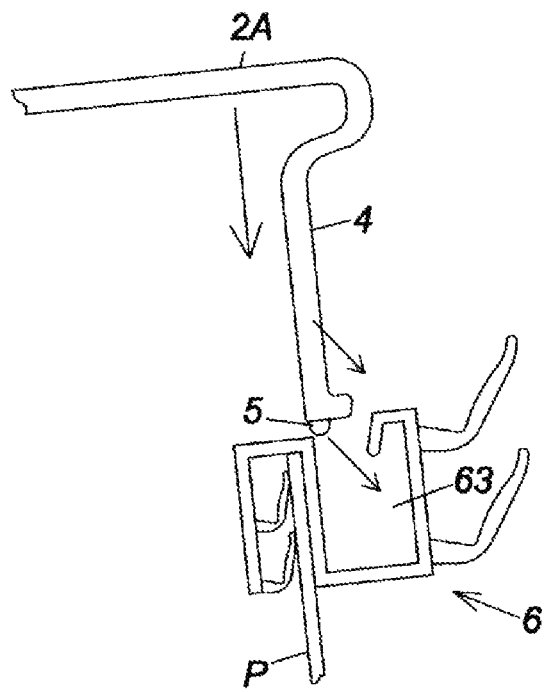
FIGS. 4A and 4B are each an explanatory illustration of the first flange inserting work on the door trim shown in FIG. 1.
Figure 4B:
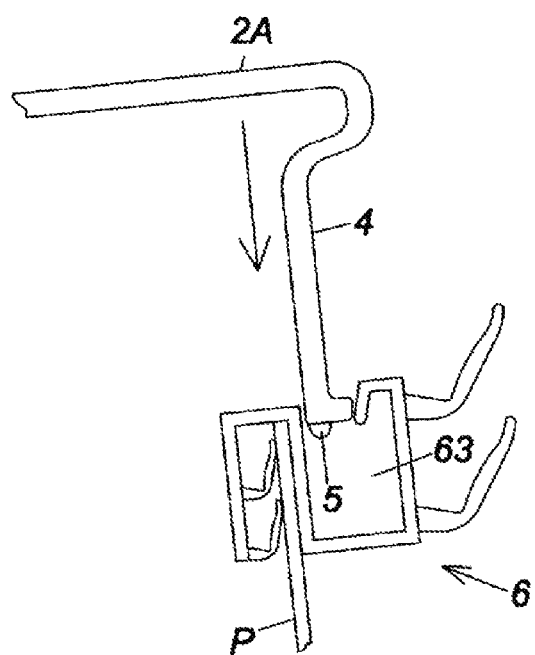
Figure 5:
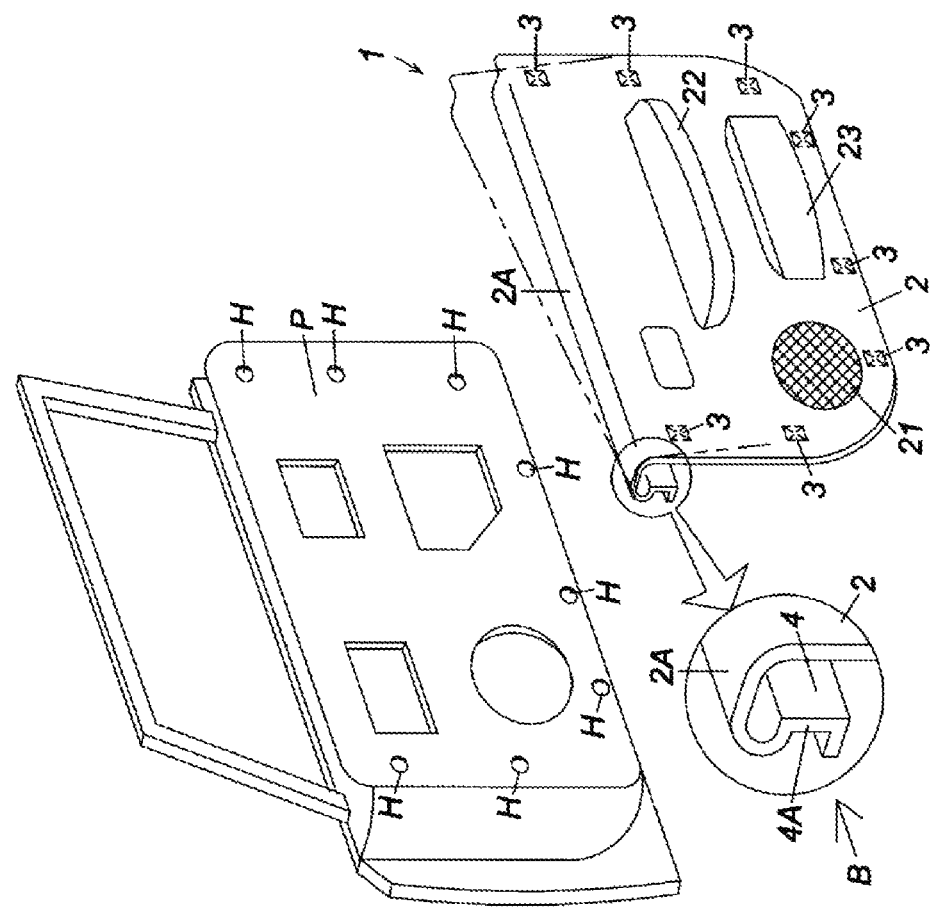
FIG. 5 is a schematic perspective view of a conventional automotive interior component (a door trim) and a conventional vehicle body panel.
Figure 6:
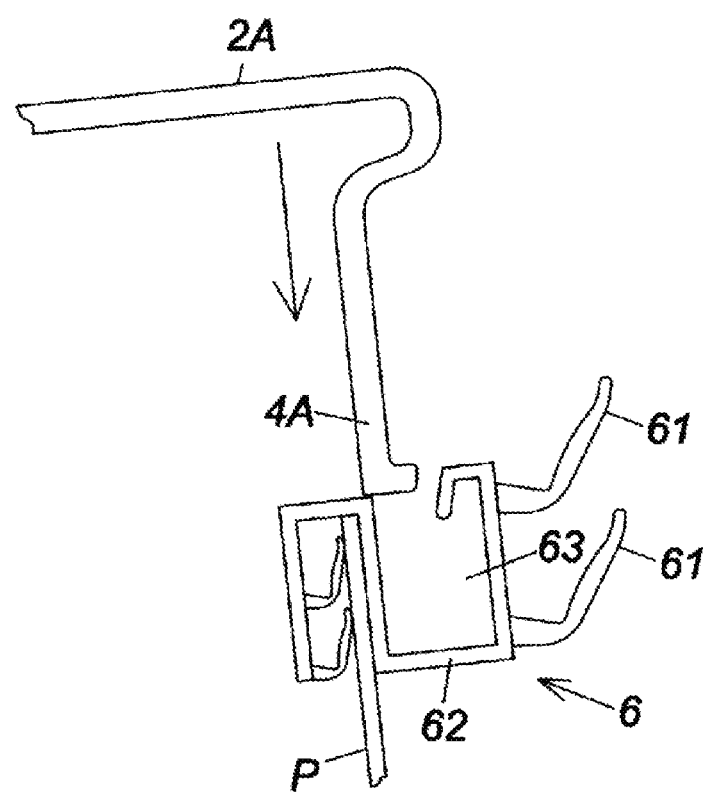
FIG. 6 is a view on arrow B in FIG. 5 (the state where the portion around one end of the flange is stuck at the edge of the groove).

In performing the above-described first flange inserting work, as shown in FIG. 4A, an insert position misalignment of the flange 4 relative to the groove 63 may occur. In this case, the projecting part 5 enters inside the groove 63 preceding the portion around the one end of the flange 4. Subsequently, the portion around the one end of the flange 4 enters inside the groove 63. Thus, as shown in FIG. 4B, the insert position misalignment of the flange 4 is automatically corrected and, therefore, the first flange inserting work can be performed without trouble.

Procedure 2

When the first flange inserting work in the procedure 1 is finished, next, the final flange inserting work is performed. Specifically, the final flange inserting work includes: (1) rotating the whole trim body 2 about the portion around the one end 4A of the flange 4 inserted into the groove 63 in the first flange inserting work, so as to correct the above-described tilted attitude of the trim body 2 and recover the original attitude without the tilt; and (2) in the final stage of such an attitude correction work, inserting the whole tip of the flange 4 following the portion around the one end into the groove 63, so as to set the whole tip of the flange 4 to be inserted into the groove 63.

Procedure 3

When the final flange inserting work in the above-described procedure 2 is completed, finally, the final fixing work of the trim body 2 is performed. The final fixing work includes pressing the surface of the trim body 2 against the vehicle body panel P. and mounting and fixing the trim body 2 onto the vehicle body panel P with the trim mount-fixing means 3.

Operation and Effect

In the door trim 1 according to the present embodiment, as described above, the projecting part 5 is provided at the tip of the flange 4. The projecting part 5 is positioned around the one end 4A of the flange 4 firstly inserted into the groove 63. The projecting part 5 enters the groove 63 preceding the portion around the one end 4A of the flange 4 when an insert position misalignment of the flange 4 relative to the groove 63 occurs. Thus, the projecting part 5 functions as means for correcting the insert position misalignment of the flange 4. Accordingly, in performing the first flange inserting work, when an insert position misalignment of the flange 4 occurs, the insert position misalignment is corrected by the function of the projecting part 5. This provides the operation and effect of the facilitated and trouble-free first flange inserting work and improved workability in mounting the door trim 1 on the vehicle body panel P.

Modifications or Applicability of the Present Invention

The present invention is not limited to the above-described embodiment, and various modifications may be made by a person skilled in the art within the scope of the technical idea of the present invention.

The above-described door trim 1 is one example of an automotive interior component, and the present invention is applicable to any automotive interior component other than the door trim 1.

Furthermore, in the above-described embodiment, while the groove 63 of the seal base part 52 is employed as one example of the groove into which the tip of the flange 4 of the trim body 2 is inserted, the present invention is not limited thereto. A groove formed at any member other than the seal base part 52 may be employed as the groove 63 into which the tip of the flange 4 of the trim body 2 is inserted.

REFERENCE SIGNS LIST 1 door trim (automotive interior component)
2 trim body
2A upper edge of trim body
21 speaker grille
22 armrest
23 door pocket
3 trim mount-fixing means
4 flange
4A one end of flange
5 projecting part
6 inner seal member
61 elastic seal part
62 seal base part
63 groove
G gap
H mount hole
P vehicle body panel

The invention claimed is:

1. An automotive interior component comprising:
a trim body formed of resin to have a predetermined shape;
a trim mount-fixing member for mounting and fixing the trim body onto a vehicle body panel;
a flange folded back downward from an upper edge of the trim body; and
a projecting part provided at a tip of the flange, wherein
with the trim body being tilted down on one of vehicle front and rear sides, by a portion around one end of the flange being firstly inserted into a groove provided on the vehicle body panel side, the flange and the groove as a whole function as determining an initial mount position of the trim body relative to the vehicle body panel,
by the projecting part being positioned only around the one end of the flange firstly inserted into the groove and entering inside the groove preceding the portion around the one end of the flange when an insert position misalignment of the flange relative to the groove occurs, the projecting part functions as correcting the insert position misalignment of the flange, and
the projecting part functions as allowing an operator to ascertain a provision of a desired gap between the tip of the flange and a bottom of the groove by providing the operator with an abutting touch of a tip of the projection against the bottom of the groove.

2. An automotive interior component mounted to a vehicle body panel having a groove, the automotive interior component comprising:
a trim body formed of resin to have a predetermined shape;
a trim mount-fixing member for mounting and fixing the trim body onto the vehicle body panel;
a flange folded back downward from an upper edge of the trim body, the flange having a first end that is firstly inserted into the groove; and
a projecting part located at a tip of the flange only around the first end, the projecting part configured to correct an insert position misalignment of the flange when the insert position misalignment of the flange relative to the groove occurs, the projecting part configured to allow an operator to ascertain a provision of a desired gap between the tip of the flange and a bottom of the groove by providing the operator with an abutting touch of a tip of the projecting portion against the bottom of the groove.

* * * * *